United States Patent
Hoshi et al.

[11] Patent Number: 5,701,279
[45] Date of Patent: Dec. 23, 1997

[54] OPTICAL INFORMATION RECORDING-REPRODUCING APPARATUS INCLUDING A LIGHT BEAM DETECTOR BEING DIVIDED BY A DIVISION LINE EXTENDING IN A DIRECTION PERPENDICULAR TO AN INFORMATION TRACK

[75] Inventors: Hiroaki Hoshi, Yokohama; Susumu Matsumura, Kawaguchi; Masakuni Yamamoto, Yamato; Eiji Yamaguchi, Zama, all of Japan

[73] Assignee: Canon Kabushiki Kaisha, Tokyo, Japan

[21] Appl. No.: 748,621

[22] Filed: Nov. 18, 1996

Related U.S. Application Data

[63] Continuation of Ser. No. 427,714, Apr. 21, 1995, abandoned, which is a continuation of Ser. No. 118,808, Sep. 9, 1993, abandoned.

[30] Foreign Application Priority Data

Sep. 10, 1992 [JP] Japan .................. 4-266898

[51] Int. Cl.⁶ .................. G11B 11/00; G11B 7/00
[52] U.S. Cl. .................. 369/13; 369/44.38; 369/110
[58] Field of Search .................. 369/13, 110, 124, 369/44.38, 44.39, 44.41, 116, 112, 54, 48, 44.27, 44.28; 360/114, 59; 365/122

[56] References Cited

U.S. PATENT DOCUMENTS 5,105,399  4/1992  Shimonou .................. 369/13
5,208,792  5/1993  Imanaka .................. 369/44.38

*Primary Examiner*—Ali Neyzari
*Attorney, Agent, or Firm*—Fitzpatrick, Cella, Harper & Scinto

[57] ABSTRACT

A minute light spot is irradiated on an information track on a recording surface of a recording medium from an optical head. When reproducing an information mark train recorded on the recording surface by the mark position recording method, light reflected by or transmitted through the recording medium is guided to a divided photosensor having a division line extending in a direction perpendicular to the track. A plurality of outputs from the divided photosensor is arithmetically processed to thereby detect the central position of the information mark.

12 Claims, 16 Drawing Sheets

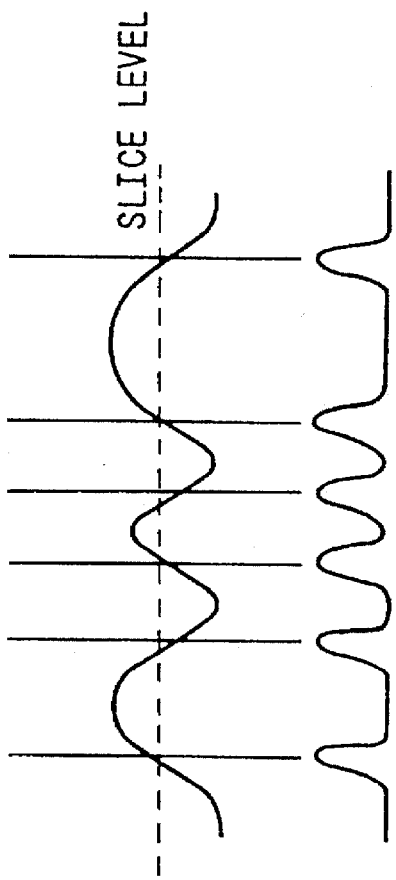
FIG. 1A PRIOR ART — MARK POSITION RECORDING
FIG. 1B PRIOR ART — DETECTION SIGNAL
FIG. 1C PRIOR ART — MARK LENGTH RECORDING
FIG. 1D PRIOR ART — DETECTION SIGNAL
FIG. 1E PRIOR ART — EDGE DETECTION SIGNAL

−1

−0.5

−0.1

0

+0.1

+0.5

+1

−1

−0.5

−0.1

0

+0.1

+0.5

+1

OPTICAL INFORMATION RECORDING-REPRODUCING APPARATUS INCLUDING A LIGHT BEAM DETECTOR BEING DIVIDED BY A DIVISION LINE EXTENDING IN A DIRECTION PERPENDICULAR TO AN INFORMATION TRACK

This application is a continuation of application Ser. No. 08/427,714 filed on Apr. 21, 1995, which is a continuation of application Ser. No. 08/118,808 filed on Sep. 9, 1993, both now abandoned.

BACKGROUND OF THE INVENTION

1. Field of the Invention

This invention relates to an optical information recording-reproducing apparatus for effecting the recording and/or reproduction of information on an optical information recording medium such as a magneto-optical disc, and particularly to an optical information recording-reproducing apparatus having its optical head unit improved.

2. Related Background Art

An optical information recording-reproducing system is utilized as the external memory means of a computer because it has a large data record capacity in spite of its compactness. Above all, magneto-optical information recording mediums are useful in that they permit the rewriting of data. As systems using such memory means to effect the recording and reproduction of information, there are known the mark position recording system and the mark length recording system (edge recording system). The latter, as compared with the former, is said to be advantageous in that data capacity can be increased, but to accurately reproduce information from a recording medium on which the information is recorded by this system, it is necessary to accurately read the edge position of an information pit by an optical head unit.

When information is to be recorded by a mark such as a pit or a domain, there are the mark position recording system which endows the central position of the mark with the meaning of the information and the mark length recording system (edge recording system) which endows the edge position of the mark with the meaning of the information. FIGS. 1A to 1E of the accompanying drawings are for illustrating these two recording systems, and FIG. 1A shows a row of marks in mark position recording. The size of the marks is approximately constant. FIG. 1B shows a detection signal obtained by the row of marks of FIG. 1A being optically reproduced, FIG. 1C shows a row of marks in mark length recording, and FIG. 1D shows a detection signal obtained by the row of marks of FIG. 1C being optically reproduced. To know the edge position of the mark from this detection signal, for example, a slice level can be electrically provided and the position at which the detection signal of FIG. 1D crosses the slice level can be found. FIG. 1E shows the edge detection signal. In the mark position recording system, information is recorded in such a manner that the interval between the centers of adjacent marks represents the information.

Usually, in an optical head for a magneto-optical recording medium, a light beam from a semiconductor laser as a light source is condensed into a minute light spot by an objective lens and by the use of this light spot, the recording of data is effected in the mark position recording system and also, the whole of the quantity of reflected light of this minute light spot from an information pit is detected by a photo-detector, and any variation in the whole of the quantity of light is differentially detected to thereby effect the reproduction of information. That is, in such a conventional differential detection system, the reflected light is amplitude-divided into two signal light beams by the use of a polarizing beam splitter having an axis of polarization forming 45° with respect to the direction of polarization of incident linearly polarized light, and these two light beams are directed to two photodetectors to thereby detect two signals, from which a differential signal is produced.

This minute light spot usually has a quantity-of-light distribution like a Gaussian distribution and the base thereof is wide and is modulated by the information from an adjacent mark and therefore, the reproduction signal waveform thereof not only becomes smaller in amplitude, i.e., peak, but also the shift of the peak position thereof and the fluctuation of the DC component thereof occur as the frequency thereof becomes higher. So, many attempts have been made to solve the problem by using electrical means to carry out processes such as waveform equalization and filtering.

That is, in the reproduction of data recorded by the conventional mark position recording system, the jitter factor of the reproduced waveform caused by a reduction in MTF, the interference between the marks, etc. has been corrected by electrical post-processing. Accordingly, to improve the frequency characteristic of the phase delay caused by the electrical processing, the scale of the circuit has become large and the number of locations to be adjusted has become great, and this has hindered the downsizing and reduced cost of the apparatus.

SUMMARY OF THE INVENTION

The present invention has been made in view of the above-noted circumstances and intends to provide an optical information recording-reproducing apparatus in which when a minute light spot is formed on an information track on the recording surface of an information recording medium and a row of information marks are recorded on the information track by the mark position recording system, for the reproduction thereof, light reflected from or transmitted through the recording surface is directed to a divided photodetector having a division line extending in a direction perpendicular to the information track and a plurality of outputs from the divided photodetector are calculation-processed, whereby the center position of the information marks can be detected to thereby suppress the amount of reproduction jitter to a minute level.

To this end, according to the present invention, in an optical information recording-reproducing apparatus wherein a light beam from a laser is applied onto the recording surface of an information recording medium and is imaged as a minute spot on an information track and light reflected from or transmitted through the recording surface is directed to a photodetector, whereby the recording and/or reproduction of information is effected on the recording surface, a row of information marks are formed on the information track and information is recorded in such a manner that the interval between the centers of adjacent ones of the information marks represents the information, and the photodetector is comprised of a photodetector divided by a division line extending in a direction perpendicular to the information track.

BRIEF DESCRIPTION OF THE DRAWINGS

FIGS. 1A to 1E illustrate the mark position recording system and the mark length recording system.

DESCRIPTION OF THE PREFERRED EMBODIMENTS

Figure 2:
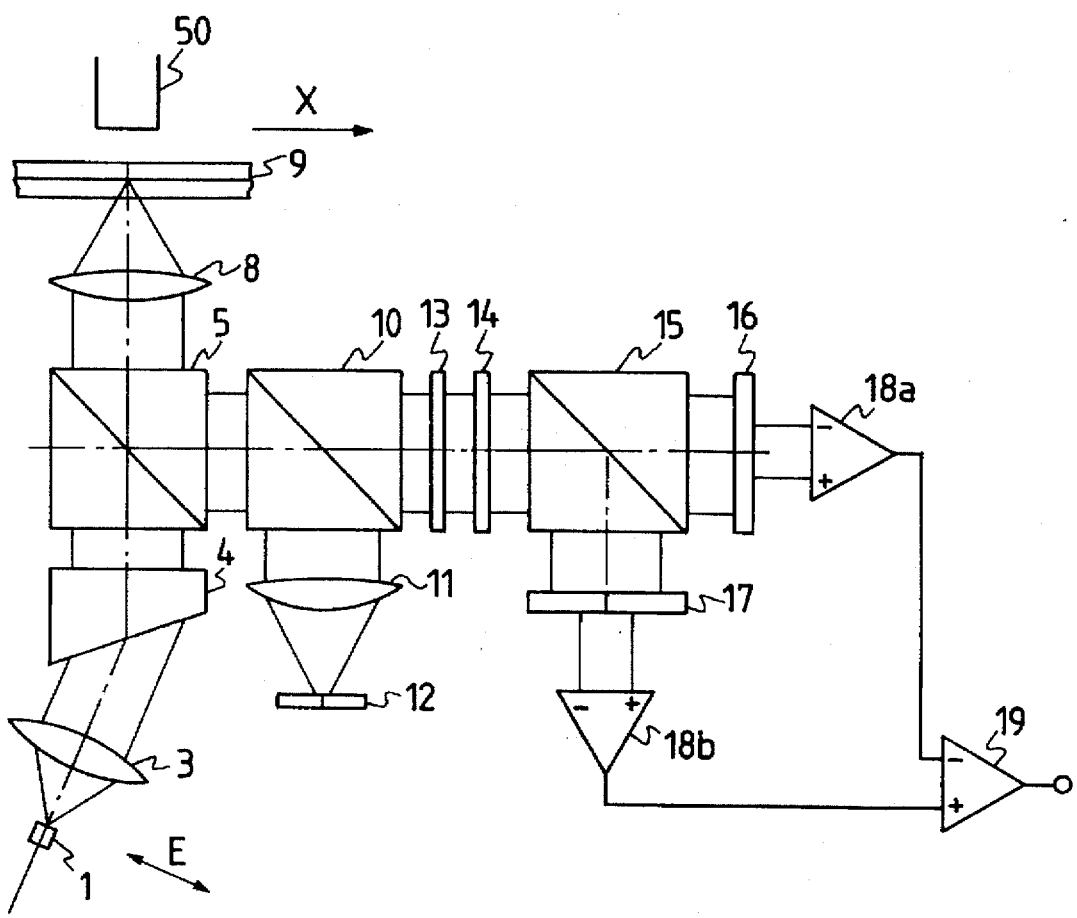
FIG. 2 shows the construction of an embodiment of an optical head for a magneto-optical disk according to the present invention.

Some embodiments of the present invention will hereinafter be described with reference to the drawings. FIG. 2 shows the construction of the optical head of a magneto-optical disc recording-reproducing apparatus according to the present invention. A magneto-optical disc 9 has a row of domain information marks formed on an information track on the recording surface thereof, and information is recorded thereon in such a manner that the interval between the centers of adjacent ones of the information marks represents the information. In FIG. 2, reference numeral 1 designates a semiconductor laser, reference numeral 3 denotes a collimator lens, reference numeral 4 designates a beam shaping prism, reference numeral 5 denotes a first polarizing beam splitter, reference numeral 8 designates a pickup lens, reference numeral 9 denotes a magneto-optical disc movable in the direction of arrow X relative to the pickup lens 8, reference numeral 10 designates a beam splitter, reference numeral 11 denotes a servo sensor lens having a cylindrical surface, reference numeral 12 designates a four-divided servo sensor, reference numeral 13 denotes a phase compensation plate, reference numeral 14 designates a half wavelength plate, reference numeral 15 denotes a second polarizing beam splitter, reference numerals 16 and 17 designate two-divided RF sensors for magneto-optical signal detection, and reference characters 18a, 18b and 19 denote differential amplifiers. The first polarizing beam splitter 5 transmits therethrough 70% of a polarized component in a direction E (P-polarized light), reflects 30% of the same polarized component and also reflects 100% of a polarized component in a direction orthogonal to the direction E (S-polarized light). The second polarizing beam splitter 15 transmits therethrough 100% of the P-polarized light and reflects 100% of the S-polarized light. The division lines of the two-divided RF sensors 16 and 17 extend in a direction perpendicular to the plane of the drawing sheet of FIG. 2 and divide the information track on the magneto-optical disc 9 into two in a direction orthogonal thereto.

Thus, the light from the laser 1 is converted into a substantially circular parallel light beam by the collimator lens 3 and the beam shaping prism 4, is condensed on the recording surface of the magneto-optical disc 9 through the first polarizing beam splitter 5 and the pickup lens 8, and is imaged as a diffraction limit light spot. Part of the reflected light from the magneto-optical disc 9 arrives at the first polarizing beam splitter 5 again through the pickup lens 8, whereby 30% of the P-polarized component and 100% of the S-polarized component are reflected and directed to a detection optical system. Here, some of the light divided by the beam splitter 10 is directed to the four-divided sensor 12 through the servo sensor lens 11. In this optical information recording-reproducing apparatus, the astigmatism method is used for auto focusing and the push pull method is used for auto tracking. The light transmitted through the beam splitter 10 is subjected to optimum phase shift by the phase compensation plate 13.

When the recording of information is to be effected, a light spot is continuously applied to the information track on the magneto-optical disc 9 by the pickup lens 8, while on the other hand, an external magnetic field corresponding to data to be recorded is applied to the information track by a magnetic head 50.

When the reproduction of information is to be effected, the output of a photodetector divided into two is converted into a spatial difference signal by a differential circuit and the difference signal is converted by a binarizing circuit to thereby detect the central position of the information marks recorded on the magneto-optical disc.

Figure 3A:
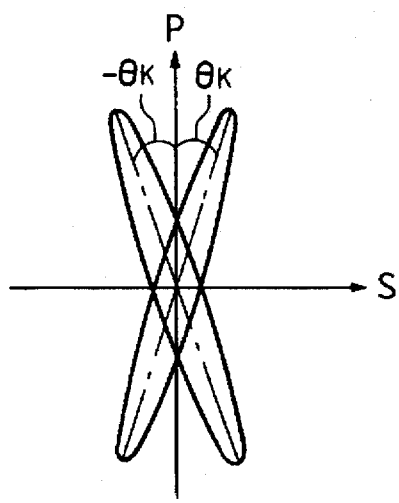
FIGS. 3A to 3E illustrate the Kerr effect.
Figure 3B:
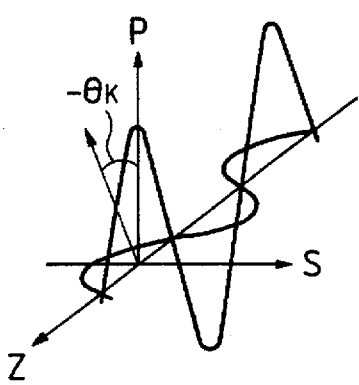
Figure 3C:
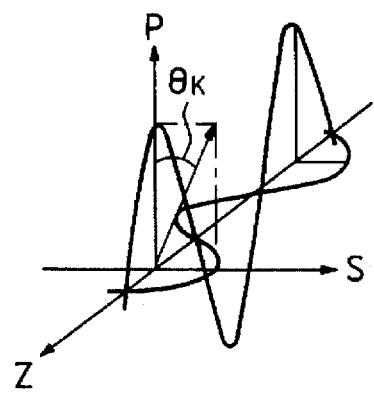
Figure 3D:
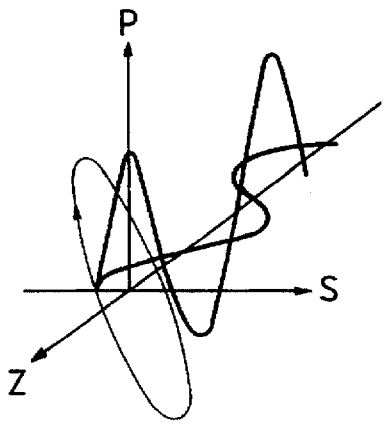
Figure 3E:
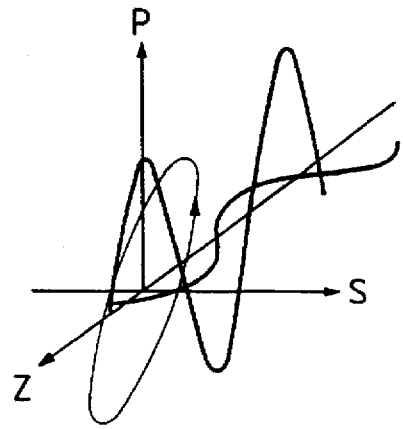

FIGS. 3A to 3E schematically illustrate the variation in polarized light by a magnetic domain. That is, when in FIG. 2, P-polarized light is caused to be incident on the magneto-optical disc, the polarized state of the reflected light therefrom is shown in FIG. 3A, wherein the positive and negative signs of the rotation angle θk of the polarized light (Kerr rotation angle) are reversed by the upward and downward directions of magnetic domains recorded. The reflected light becomes elliptically polarized light and the left to right direction thereof is also reversed. FIGS. 3B and 3C show the state of the polarized light divided into P and S-polarized components and developed in the direction of propagation when the Kerr ellipticity of the Kerr effect is 0, that is, when only the rotation of linearly polarized light is considered. FIGS. 3D and 3E show a case where the Kerr ellipticity is considered. As is apparent from these figures, the fact that the rotation of the polarized light is reversed by θ±k by the directions of the magnetic domains corresponds to the fact that the phase of the S-polarized component shifts by π. Accordingly, when considered in connection with only the S-polarized component, the upward and downward arrangement of magnetic domains can be considered to be the arrangement of phase objects having phase differences 0 and π. It will be seen that the magnetic walls, i.e., the edge portions, of the phase objects act as 0 and π phase edges and the variation in phase is very great and is a step-like steep variation.

Figure 4:
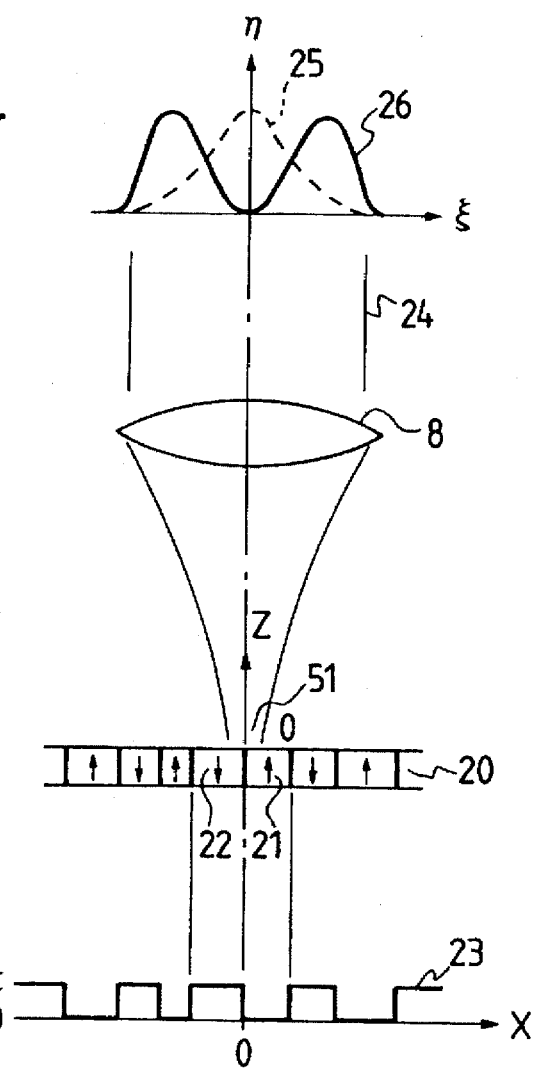
FIG. 4 illustrates the diffraction from an edge.

FIG. 4 is for schematically illustrating the diffraction wave front, on the pupil plane ξ, from such phase type edges and phase type gratings arranged on the X axis. In FIG. 4, the arrangement of upward magnetic domains 21 and downward magnetic domains 22, when considered in connection with the S-polarized component as described above, can be considered to be the arrangement of minute 0 and π phase difference objects as indicated by the reference numeral 23. When the diffracted wave from this edge is observed on the pupil plane of the pickup lens 8 or a far field area 24, any object having particularly its amplitude and phase spatially modulated is not present with respect to a direction E in FIG. 2, i.e., the P-polarized component, and therefore the quantity-of-light distribution thereof becomes an ordinary Gaussian distribution as indicated by the reference numeral 25. On the other hand, with respect to the S-polarized component, it is subjected to the diffraction from 0 and $\pi$ phase edges to thereby provide a two-peak quantity-of-light distribution divided at the center. This is due to the diffraction which is the interaction between a minute object and light, and differs in principle from a case where the diffraction phenomenon is negligibly small. For example, in the case of FIG. 4, the quantity-of-light distribution is divided into two peaks, whereas these are not independent light beams, but are a diffraction pattern made on an interference far field by the wave surface from each point in a diffraction limit spot 51. That is, they are not the geometrical arrangement of reflected polarized light beams from the upward magnetic domains 21 and reflected polarized light beams from the downward magnetic domains 22, but are a wave surface formed by the wave surfaces from respective points in the respective magnetic domains existing everywhere on the far field and interfering with one another. This is, as it were, a pattern created as a result of the wave surfaces from the upward and downward magnetic domains mixing with one another, and it is impossible to geometrically consider the polarized light from each magnetic domain, spatially separate it and specify it as shown in the example of the prior art.

Figure 5A:
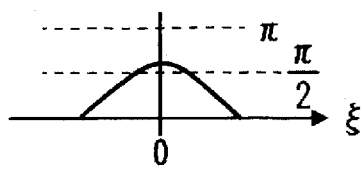
FIGS. 5A to 5G illustrate diffraction patterns.
Figure 5B:
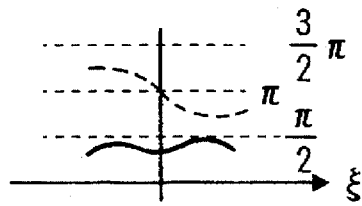
Figure 5C:
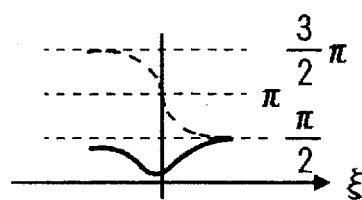
Figure 5D:
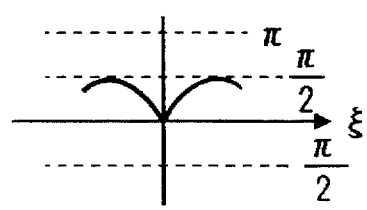
Figure 5E:
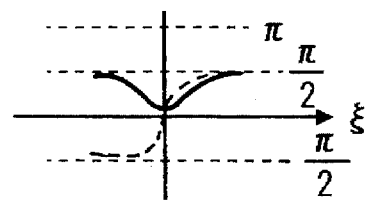
Figure 5F:
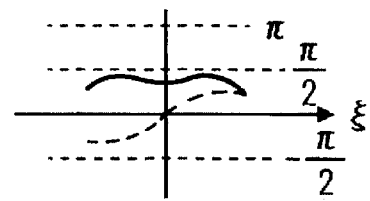
Figure 5G:
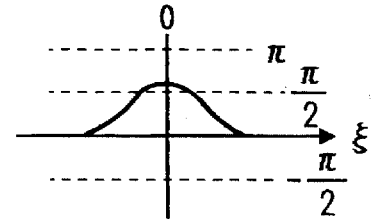

FIGS. 5A to 5G show the diffraction wave surface on the pupil plane of the lens 4 obtained by calculation with regard to the S-polarized light when in FIG. 4, the diffraction limit spot 51 is scanned in the X direction. FIGS. 5A to 5G show the difference in the spot position on x coordinates normalized by the spot diameter. In these figures, solid lines represent the amplitude distributions of the diffraction wave surface, and broken lines represent the phase distributions thereof. However, for simplicity, the phases are represented by relative values. FIG. 5A shows a case where the spot 51 is projected onto only the downward magnetic domains 22, and the amplitude distribution is Gaussian and the phase distribution is subjected to a shift by $\pi$ rad indicated by the reference numeral 23. When the edge comes into the spot, a depression is created at the center of the amplitude distribution, as shown in FIGS. 5B to 5F, and particularly in FIG. 5D wherein the optical axis and the edge coincide with each other, the amplitude distribution is divided into two peaks. The phase distribution is subjected to modulation about $\pi$ rad as shown in FIGS. 5B and 5C by the edge coming into the spot as described above, and in FIG. 5D, it skips to the modulation centering around 0 rad. Thereafter, as the edge comes out of the light spot, the modulation becomes smaller, and as regards the diffraction wave surface from the upward magnetic domains 21 of phase 0 rad, the phase thereof becomes 0 rad as shown in FIG. 5G, and the amplitude distribution restores Gaussian distribution.

As can be seen from this result, in the reproduction utilizing the diffraction phenomenon of the present invention, even in FIGS. 5B, 5C, 5E and 5F wherein the edge deviates from the optical axis, a diffraction pattern is created by the superposition of the wave surfaces from respective points in the respective magnetic domains, and particularly the phase distribution thereof corresponds to the spatial distribution of the polarized state and therefore, reproduction utilizing the asymmetry of the phase thereof becomes possible. In this case, however, it is impossible to describe the wave surfaces of FIGS. 5B, 5C, 5E and 5F geometrically or geometrically optically in terms of the reflected polarized state from a particular magnetic domain.

Figure 6A:
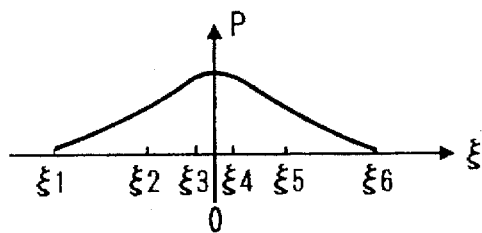
FIGS. 6A to 6I illustrate polarized states.
Figure 6B:
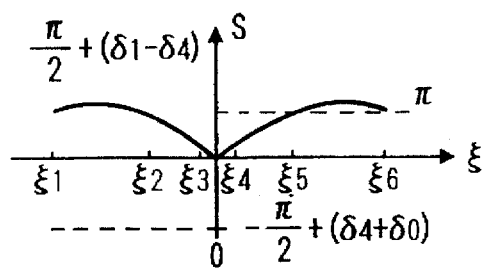
Figure 6C:
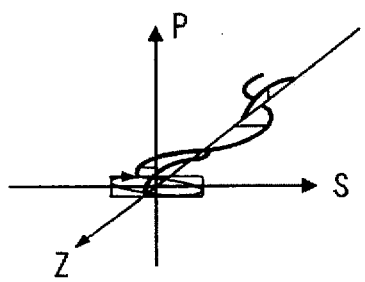
Figure 6I:
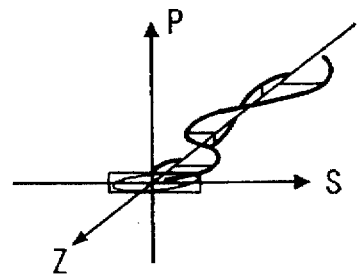
Figure 6D:
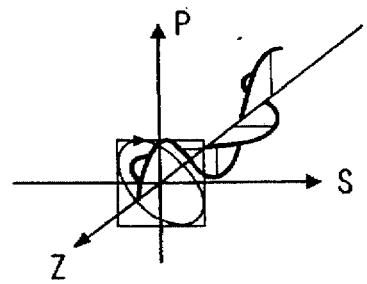
Figure 6H:
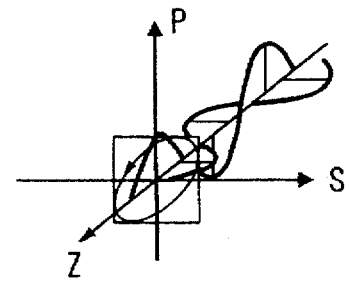
Figure 6E:
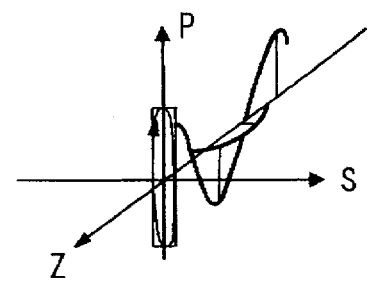
Figure 6F:
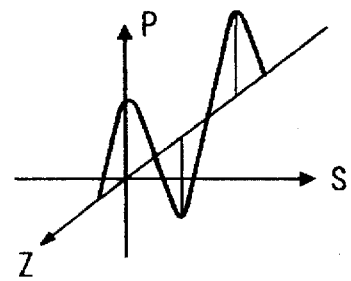
Figure 6G:
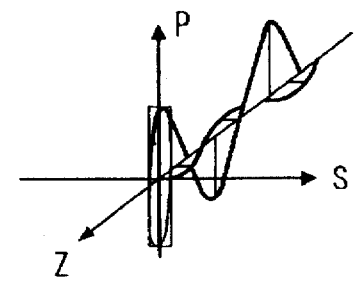

Next, consider a case where the S-polarized light thus subjected to the modulation by the magneto-optical domains and the P-polarized light not subjected to such modulation are combined together and are caused to interfere with each other. In the embodiment of FIG. 2, the fast axis of the quarter wavelength plate 14 is rotated by 22.5° about the optical axis, and polarized lights orthogonal to each other are projected onto an analyzer of ±45° by the second polarizing beam splitter 15, whereby the polarized lights can be combined together and caused to interfere with each other. FIGS. 6A to 6I represent the polarized state on the pupil plane when the phase compensation plate 13 is absent. FIGS. 6A and 6B represent the amplitude distribution (solid line) and phase distribution (broken line), respectively, of P and S-polarized lights. This is the case of FIG. 5D wherein the edge is at the center of the light spot, and here, consideration is given to the Kerr ellipticity $\delta k$ as shown in FIGS. 3D and 3E and the phase difference $\delta o$ created by the polarizing characteristic of the optical disc substrate or the intermediate optical system and therefore, the phase distribution of $\pm \pi/2$ by diffraction shifts by $(\delta o + \delta k)$ (in this case, shifts to the negative side).

FIGS. 6C, 6D, 6E, 6F, 6G, 6H and 6I represent the polarized states at points $\xi = \xi_1$, $\xi_2$, $\xi_3$, 0, $\xi_4$, $\xi_5$ and $\xi_6$ respectively, on the pupil plane, and show the manner in which the polarized state is non-uniformly distributed in the pupil plane. The intensity of light $I(\xi)$ detected by an analyzer of ±45° at each point is expressed as $$I(\xi) = \frac{1}{2}[Ap(\xi)^2 + As(\xi)^2] \pm Ap(\xi) \cdot As(\xi) \cos \delta,$$

where Ap and As are the amplitudes of the P and S-polarized lights, respectively, and $\delta$ is the phase difference therebetween. Since $Ap(\xi) = Ap(-\xi)$ and $As(\xi) = As(-\xi)$, the difference between the quantity-of-light distributions of the two areas of $\xi > 0$ and $\xi < 0$ is given by the following expression:

$$|Ap(\xi) As(\xi) \cos \delta|.$$

The Kerr ellipticity $\delta k$ is in Kramers-Kronig relation with the Kerr rotation angle $\theta k$, and since $\theta k$ is as small as 1° or less, $\delta k$ is substantially of the same order. Also, the phase difference $\delta o$ differs depending on the magneto-optical disc and optical head, but since it is usually suppressed to a small level, $|\delta k + \delta o|$ is minute. Thus, $\delta$ may be considered to be $\delta = \pm(\pi/2) + (\delta k + \delta o) = \pm(\pi/2)$.

That is, the non-uniformity of the quantity of light in the pupil plane is $$|Ap(\xi) As(\xi) \cos [\pm(\pi/2) + \delta k + \delta o]| = |Ap(\xi) As(\xi) \sin (\delta k + \delta o)| \approx 0$$

and the degree of modulation of the output waveforms of the amplifiers 18a, 18b and 19 spatially differentiated by the division sensors 16 and 17 is very minute. Further, with the conventional optical head for mark position detection, it is often the case in such phase compensation that the degree of modulation is most increased, that is, $\delta = \delta o + \delta k = 0$, when the detection of the fluctuation of the total quantity of light by a single non-division photodetector is effected and a single magneto-optical domain exists in the light spot, and therefore in such an optical head, the amplitude of the spatial difference signal becomes 0.

Figure 7:
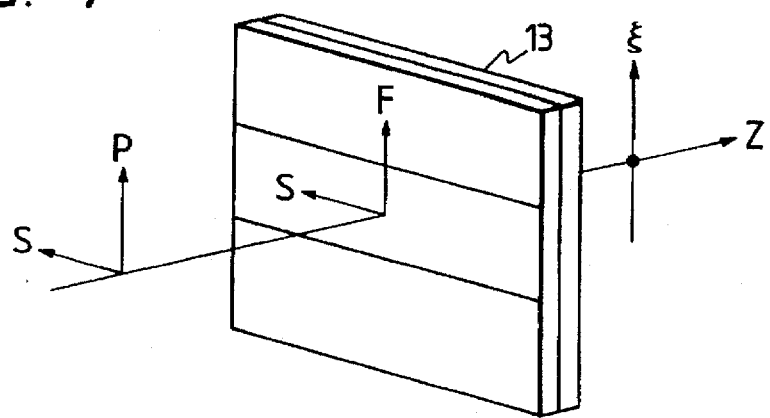
FIG. 7 illustrates phase compensation.

FIG. 7 is a schematic view of the phase compensation plate 13. The phase compensation plate 13 is formed of rock crystal, and is of cemented structure utilizing the difference in thickness so as to offset optical activity and use birefringence alone. The thickness of the phase compensation plate 13 is set so that the overall phase difference between a fast axis F (an axis along which the phase advances relatively) and a slow axis S (an axis along which the phase is delayed relatively) may be $(\pi/2)-(\delta k+\delta o)$. Also, the fast axis F is made coincident with the direction of P-polarized light and the slow axis S orthogonal thereto is made coincident with the direction of S-polarized light. It has already been made clear that when the domain edge is on the optical axis of the light spot, the phase distribution of the S-polarized light on the pupil plane, with the phase of the P-polarized light as the reference, is $-(\pi/2)+(\delta k+\delta o)$ and $(\pi/2)+(\delta k+\delta o)$, but this phase distribution of the S-polarized light is delayed by $(\pi/2)-(\delta k+\delta o)$ relative to the P-polarized light by the above-described phase compensation plate 13 and therefore, becomes 0 and $\pi$ relative to the P-polarized light after the S-polarized light passes through the phase compensation plate 13.

Figure 8A:
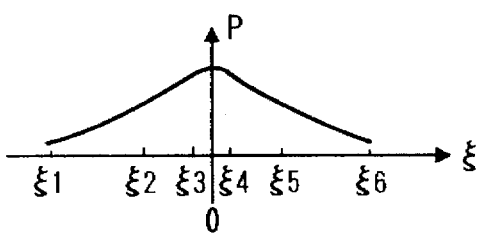
FIG. 8A to 8I illustrate polarized states.
Figure 8B:
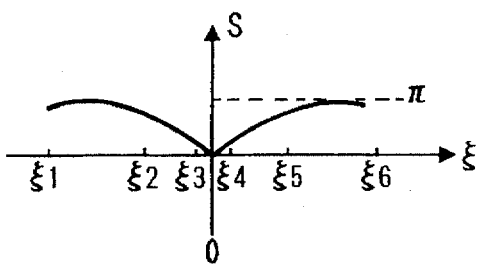
Figure 8C:
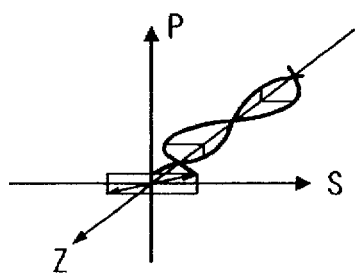
Figure 8I:
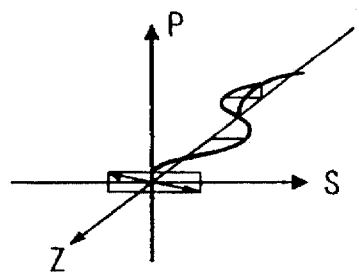
Figure 8D:
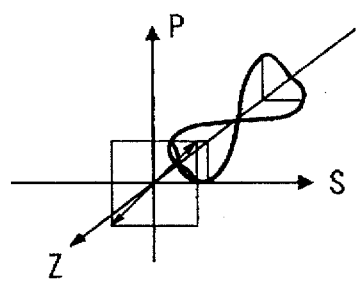
Figure 8H:
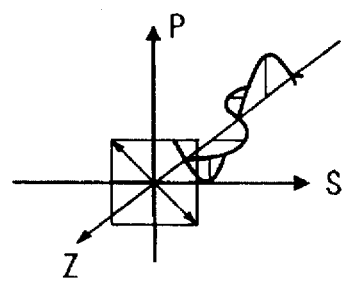
Figure 8E:
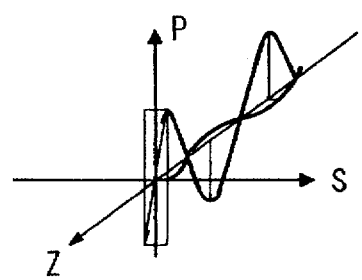
Figure 8F:
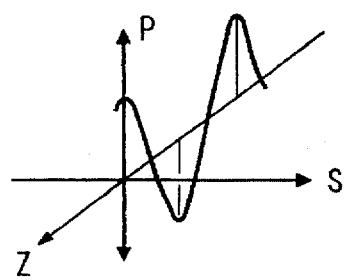
Figure 8G:
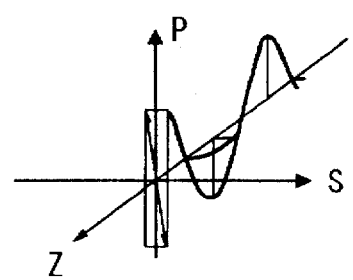
Figure 9A:
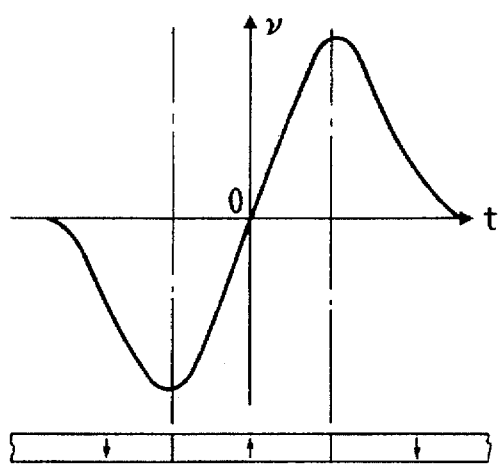
FIGS. 9A to 9F schematically show signal waveforms.
Figure 9D:
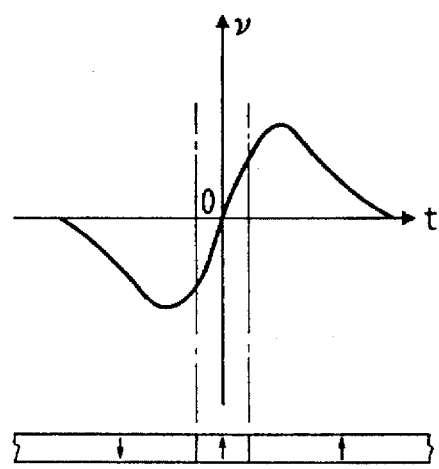
Figure 9B:
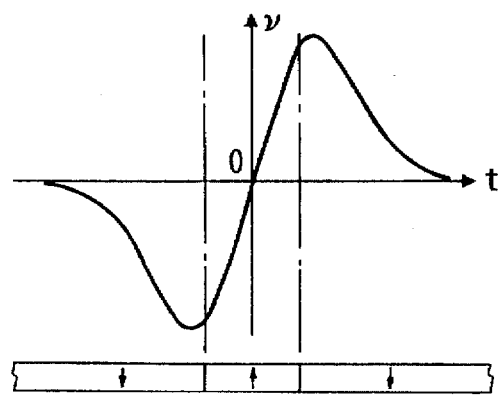
Figure 9E:
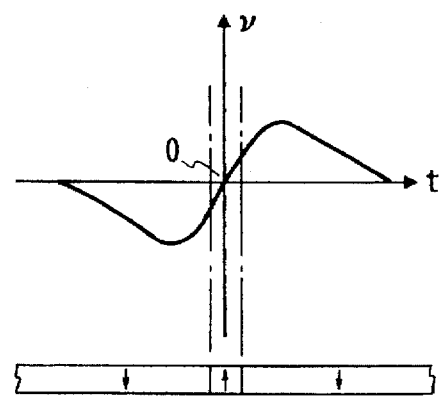
Figure 9C:
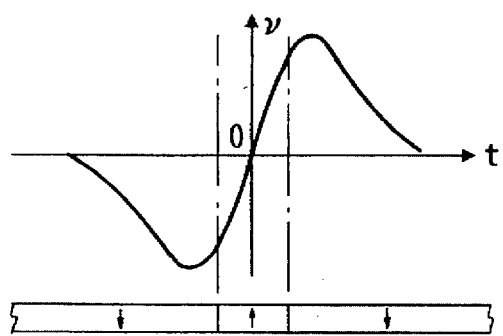
Figure 9F:
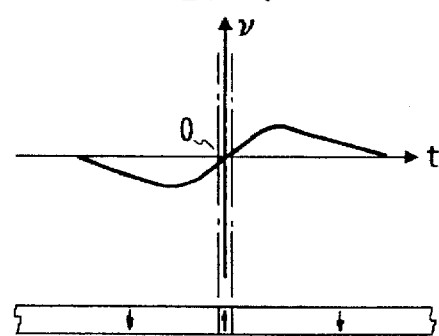

FIGS. 8A to 8I show the polarized states of the P and S-polarized lights after being subjected to phase correction by the phase compensation plate 13, and corresponds to FIGS. 6A to 6I. As shown in FIG. 8B, when the phase of the P-polarized light is the reference (0 rad), operation is performed so that the phase distribution of the S-polarized light may be rendered into 0 and $\pi$ rad by the phase compensation plate 13. That is, in FIGS. 6A to 6I, the phase which has been $-(\pi/2)+(\delta k+\delta o)$ for $\xi<0$ is delayed and rendered into 0, and the phase which has been $+(\pi/2)+(\delta k+\delta o)$ for $\xi>0$ is delayed and rendered into $\pi$. By this operation, the polarized states at the respective points $\xi_1, \xi_2, \xi_3, 0, \xi_4, \xi_5$ and $\xi_6$ become such as shown in FIGS. 8C, 8D, 8E, 8F, 8G, 8H and 8I, respectively. In this case, the phase difference $\delta$ between the P-polarized light and the S-polarized light is 0 or $\pi$ and therefore, the light is not elliptically polarized light, but linearly polarized light. However, it will be seen that the rotation angle and amplitude of the polarized light are distributed non-uniformly. As in the previously described case, with respect to the distribution of the polarized light of FIGS. 8A to 8I, the slow axis is rotated by 22.5° relative to the direction of the P-polarized light by the half wavelength plate 14, whereby each polarized state is rotated by 45°. Thereby, the combined wave interference intensity distributions set to ±45° with respect to the P-polarized light axis by the analyzer are obtained as transmitted light and reflected light by the second polarizing beam splitter 15 for differential detecting construction which eliminates noise of the same phase.

As can be seen from FIGS. 8A to 8I, great asymmetry is created in the intensity distributions. Comparing this at $\xi=\xi_1, \xi_6$, from $Ap(\xi_1)=Ap(\xi_6)$ and $As(\xi_1)=As(\xi_6)$, it follows that $$I(X_1) = [Ap(\xi_1)^2]/2 + [As(\xi_1)^2]/2 \pm Ap(\xi_1)As(\xi_1)\cos 0$$
$$= [Ap(\xi_1)^2]/2 + [As(\xi_1)^2]/2 \pm Ap(\xi_1)As(\xi_1)$$
$$I(\xi_6) = [Ap(\xi_6)^2]/2 + [As(\xi_0)^2]/2 \pm Ap(\xi_6)As(\xi_6)\cos\pi$$
$$= [Ap(\xi_1)^2]/2 + [As(\xi_1)^2]/2 \mp Ap(\xi_1)As(\xi_1).$$

That is, the asymmetry obtained is the greatest asymmetry. Accordingly, the greatest degree of modulation is obtained as an edge detection signal.

Similar greatest asymmetry is created at the other pairs of points ($\xi_2, \xi_5$) and ($\xi_3, \xi_4$) as well. That is, when the asymmetry of the intensity distributions is detected by the two-divided sensors 16 and 17 and the difference is detected by the differential detectors 18a and 18b, the amplitude of the signal is proportional to $2ApAs$. In the case of the prior art shown in FIGS. 6A and 6I, the amplitude is $2ApAs \cdot \sin(\delta k+\delta o)$ and minute, but the limit greatest amplitude is obtained by the present invention.

FIGS. 9A to 9F show examples of the output waveforms of the differential detector 19, and show the manner in which isolated domains of upward magnetization exist in an area sufficiently larger than the light spot which is of uniformly downward magnetization. FIGS. 9A to 9F show the output waveforms when a light spot of a diameter 2.2 $\mu m\phi$ has been scanned on the isolated domains, and more particularly show the output voltage waveforms when the lengths of the isolated domains are 2.0 $\mu m$, 1.2 $\mu m$, 0.9 $\mu m$, 0.6 $\mu m$, 0.4 $\mu m$ and 0.2 $\mu m$, respectively. These isolated domains show a case where the influence of the nearly infinitely large domains on the opposite sides thereof is greatest. In the case of the domain length of 2.0 $\mu m$ shown in FIG. 9A the output wave-form is somewhat smaller than the diameter of the light spot, but has a peak in the edge portion of the domain. However, as the domain length becomes shorter, the peak of the output waveform shifts from the edge portion, and at a domain length of 0.6 $\mu m$ shown in FIG. 9D (1/3 or less of the diameter of the light spot), a peak appears at a position double the edge position or higher, and the value of the peak also decreases. It will be seen, however, that according to the difference detection by the present invention, the zero cross position of the output waveform does not shift from the center of the domain. If thus, the length of the information mark (domain) in the direction of the information track is smaller than the diameter of the light spot, reproduction can be effected well.

Figures 10A, 10B, 10C, 10D:
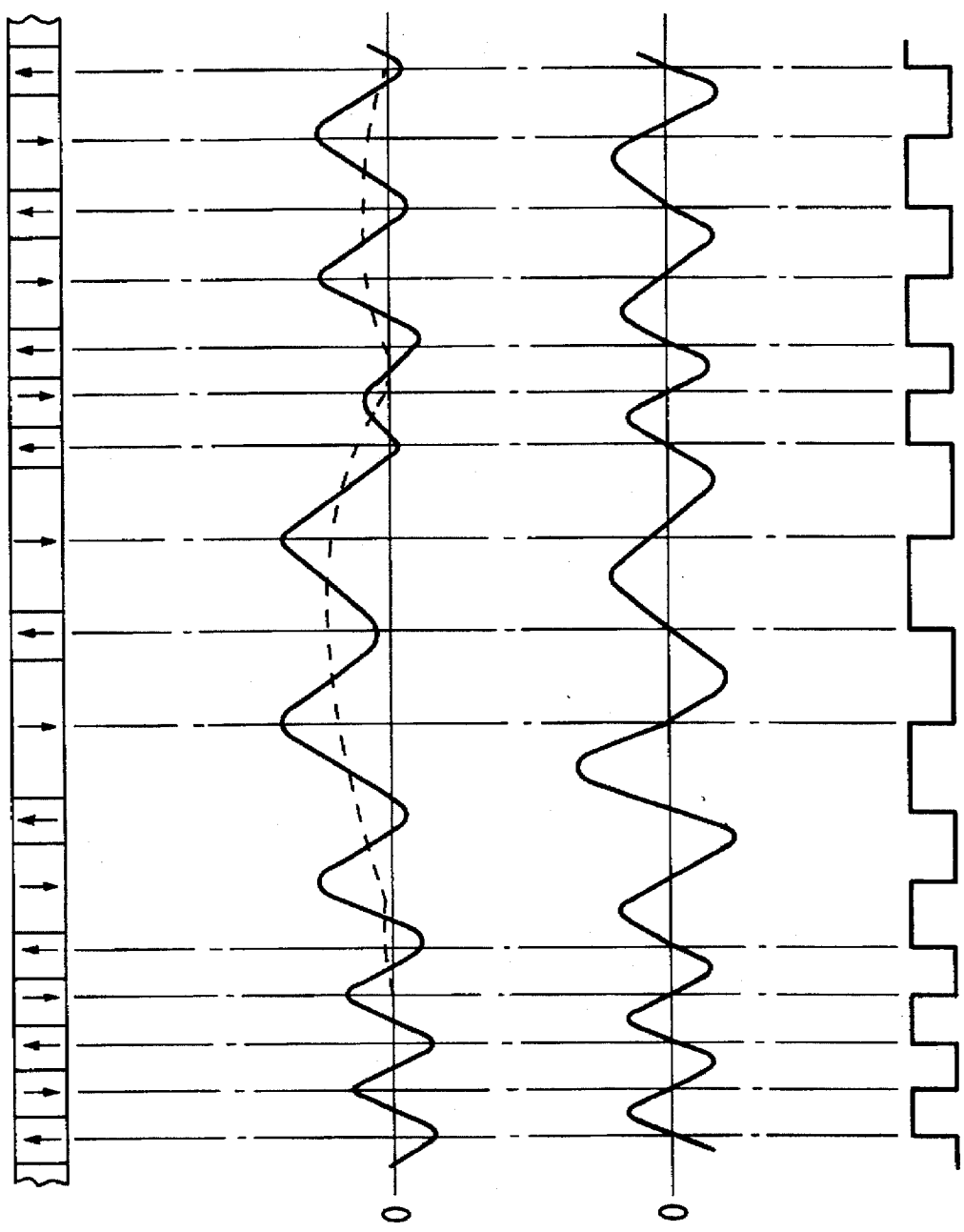
FIGS. 10A to 10D schematically show signal waveforms.

FIGS. 10A to 10D schematically show the reproduction signal waveform, and more particularly show it by a waveform when a row of magneto-optical domains in the mark position recording system as shown in FIG. 10A are reproduced by an optical head using a conventional single no-division sensor (FIG. 10B), a waveform when the row of magneto-optical domains are reproduced by the present invention (FIG. 10C), and a waveform in which a binary signal is formed therefrom (FIG. 10D). In the conventional system, as is apparent from FIG. 10B, not only the fluctuation of a DC component as indicated by a broken line appears greatly, but also the shift of a peak is caused by the asymmetry of the lengths of adjacent ones of the domains and a jitter component appears and thus, accurate reproduction is not effected. In contrast, according to the present invention, the output of the differential detector 19 zero-crosses at the central position of the magneto-optical domains, as shown in FIG. 10D, and therefore the setting of the binarization threshold value is simple and the circuit may also be simple and thus, it will be seen that adjustment is almost unnecessary.

Figure 11:
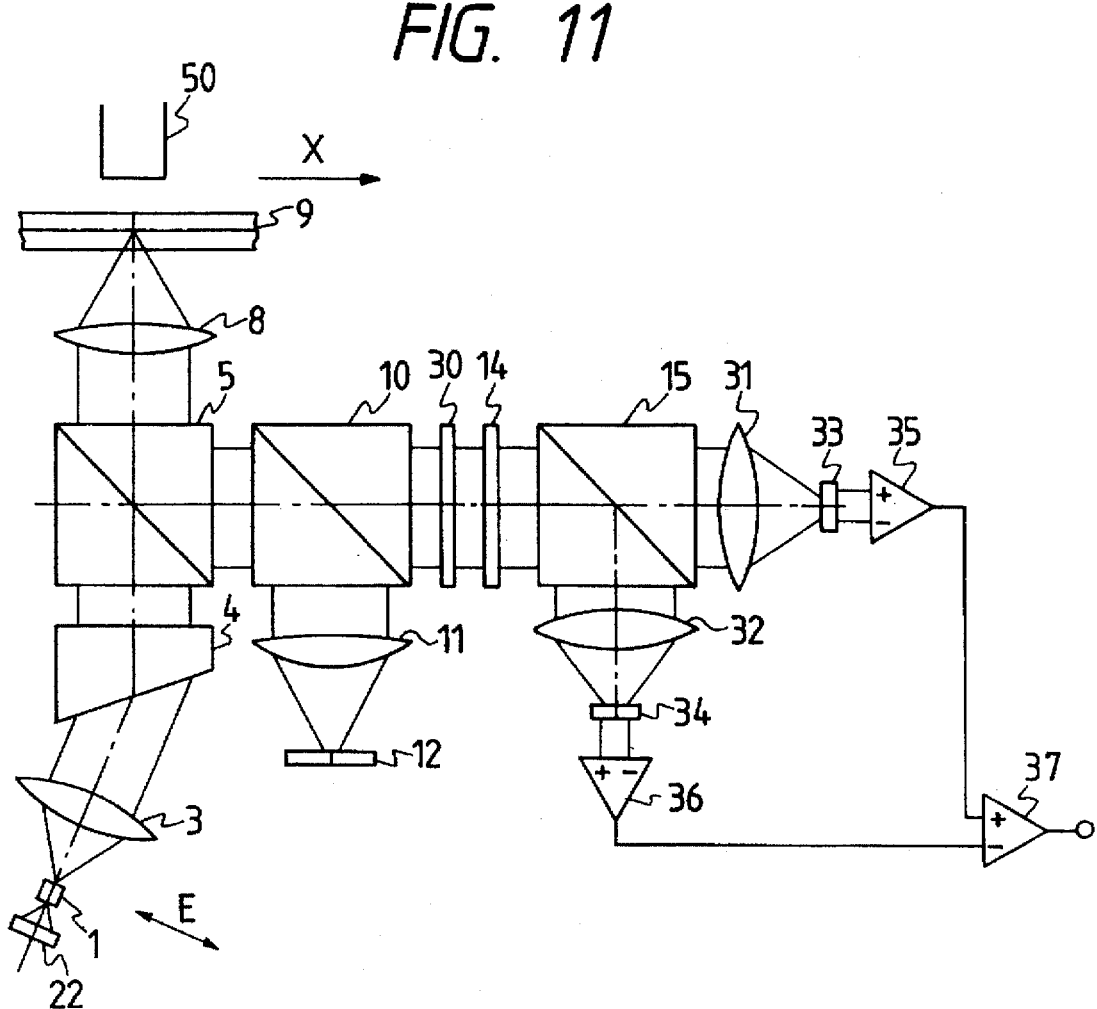
FIG. 11 shows the construction of another embodiment of the optical head.

Another embodiment of the present invention will now be described. FIG. 11 shows the construction of the optical head of the magneto-optical disc recording-reproducing apparatus according to the present invention. In FIG. 11, the same constituents as those of the embodiment of FIG. 2 are designated by the same reference numerals. The embodiment of FIG. 2 is of a construction for pupil plane detection, whereas the embodiment of FIG. 11 is of a construction for re-imaging plane detection. In FIG. 11, reference numeral 30 designates a phase compensation plate, reference numerals 31 and 32 denote sensor lenses, reference numerals 33 and 34 designate two-divided RF sensors for magneto-optical signal detection (the division line extends in a direction perpendicular to the plane of the drawing sheet of FIG. 11, i.e., a direction orthogonal to the tracks on the magneto-optical disc 9), and reference numerals 35, 36 and 37 denote differential amplifiers.

Figure 12A:
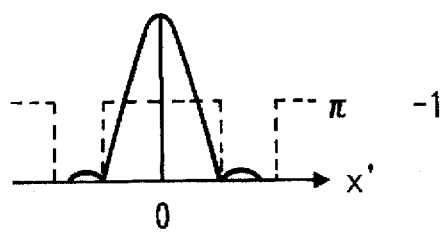
FIGS. 12A to 12G illustrate diffraction patterns.
Figure 12B:
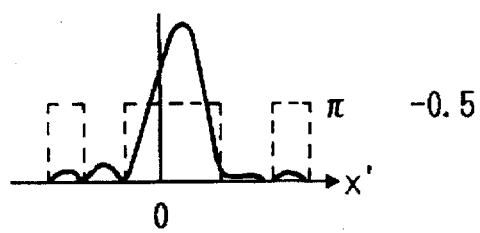
Figure 12C:
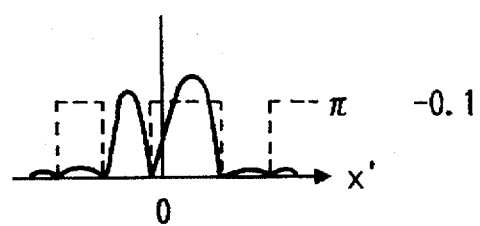
Figure 12D:
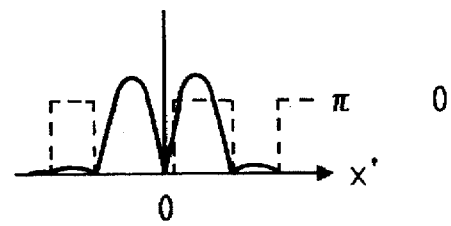
Figure 12E:
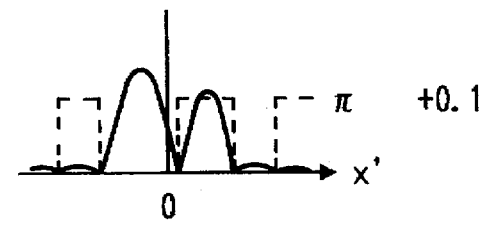
Figure 12F:
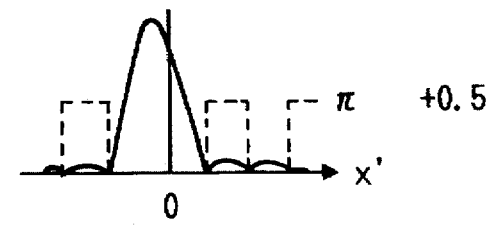
Figure 12G:
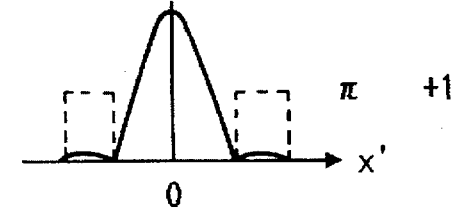
Figure 14A:
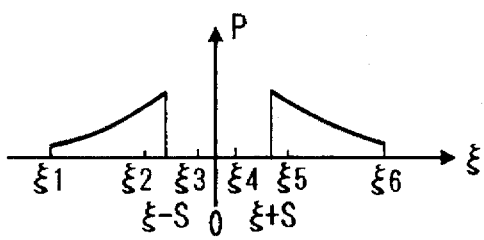
FIGS. 14A to 14I illustrate polarized states.
Figure 14B:
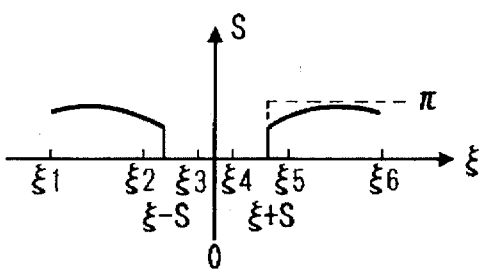
Figure 14C:
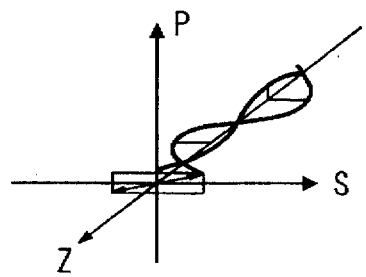
Figure 14I:
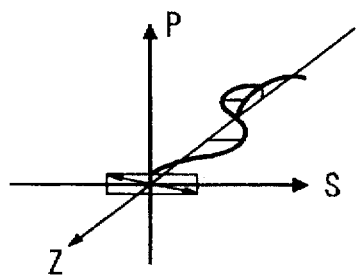
Figure 14D:
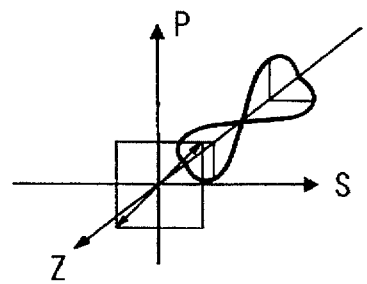
Figure 14H:
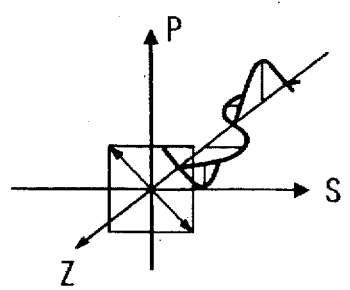
Figure 14E:
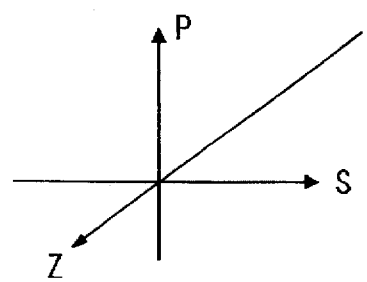
Figure 14F:
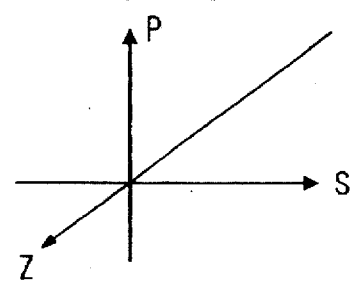
Figure 14G:
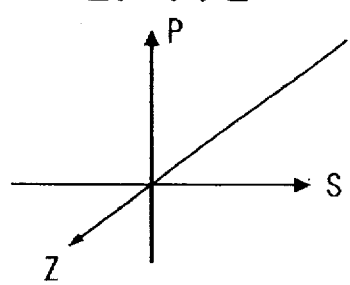

As in the aforedescribed embodiment, in order to make the difference in principle between the prior art and the present invention clear, consideration is first given to a case where the phase compensation plate 30 is absent and the Kerr ellipticity is 0. FIGS. 12A to 12G show the wave surfaces of the S-polarized light of a light spot on the re-imaging planes of the sensor lenses 31 and 32 when a diffraction limit spot scans on the magneto-optical disc 9. FIGS. 12A to 12G show the differences between the spot positions normalized by the spot diameter, and in these figures, solid lines indicate amplitude distributions and broken lines indicate phase distributions. However, the phase distributions are relative values when the uniform phase distribution of the P-polarized light is a reference value 0. It will first be understood from this that very much unlike the variation in the diffraction wave surface on the pupil plane shown in FIGS. 5A to 5G, the present embodiment basically differs from the afore-described example of the prior art in which the same operation is performed for the pupil plane detection and for the re-imaging plane detection. When the edge is not within the spot, FIGS. 12A and 12G basically assume a Gaussian type amplitude distribution, and the phase becomes either $\pi$ or 0 depending on the then direction of the domains. Also, here, the pupils of the sensor lenses 31 and 32 are made smaller than the pupil of the pickup lens 8 to thereby reduce the influence of the axis deviation by tracking or the like and therefore, the diffraction patterns of zones become minute and the phase difference between the zones is $\pi$. When the edge now comes into the spot, as shown in FIGS. 12B to 12F, the amplitude distribution becomes asymmetrical and the valley in which the amplitude becomes 0 moves, and the edge comes to the center of the spot. In FIG. 12D, that valley becomes the center with a result that the amplitude distribution becomes symmetrical. Also, by the edge coming into the spot, the phase distribution assumes values of 0 and $\pi$, and these values change places with each other in each zone and in FIG. 12D, 0 and $\pi$ are created at the center. Accordingly, by the S-polarized light wave surface being combined with and caused to interfere with a P-polarized light wave surface (which is the same as the amplitude of FIG. 12G amplified) which is not affected by diffraction, the asymmetry of the intensity distribution can be created. The values the S-polarized light assumes relative to the P-polarized light at this time are 0 and $\pi$ and therefore, by two diffractions, i.e., the diffraction from the magneto-optical disc to the pupil plane of the pickup lens (which corresponds to FIGS. 5A to 5G), and the subsequent diffraction from the pupil plane of the sensor lens to the re-imaging plane, the phase distribution on the re-imaging plane becomes greatest in its asymmetry, as indicated by cos 0=1 and cos $\pi$=−1 and thus, the greatest edge signal amplitude is obtained. Actually, however, there exist the Kerr ellipticity $\delta k$ and the phase difference $\delta o$ between the P-polarized light and the S-polarized light created by the reflection by the mirror and the beam splitter and therefore, decreases in the degree of modulation of cos ($\delta k+\delta o$) and cos ($\pi+\delta k+\delta o$) occur.

In the present invention, this Kerr ellipticity and the phase distribution obtained by synthesizing the phase variation by the diffraction, the phase variation by the optical system, etc. are even partially rendered integer times as great as $\pi$ relative to the phase distribution of the reference wave surface to thereby improve the degree of modulation thereof and therefore, in the present embodiment, the phase of $\delta k+\delta o$ is corrected, whereby the greatest amplitude is attained. Accordingly, in FIG. 11, the construction of a compensation plate in which the phase difference between the fast axis and the slow axis is $\delta k+\delta o$ (or integer times as great as $\pi$) is used as the phase compensation plate 30 and the fast axis is made coincident with the direction of the P-polarized light, whereby the phase distributions of the S-polarized light wave surface on the re-imaging planes of the sensor lenses 31 and 32 can be rendered integer times as great as $\pi$ relative to the P-polarized light, as shown in FIGS. 12A to 12I. Thereby, the amplitude of the difference output by the differential amplifiers 35 and 36 can be made greatest. Accordingly, there is obtained a waveform similar to the waveforms shown in FIGS. 10A to 10D, i.e., a waveform which is free of the fluctuation of the DC component zero-crossing at the central position of the domain and which suffers little from jitter.

While the above embodiments have been described with respect to a magneto-optical disc, the present invention is also applicable to an optical disc of the uneven pit type or the phase variation type, and of course, in an encoder or an alignment apparatus as well, the present invention is best suited to detect the central position of the mark thereof.

Figure 13:
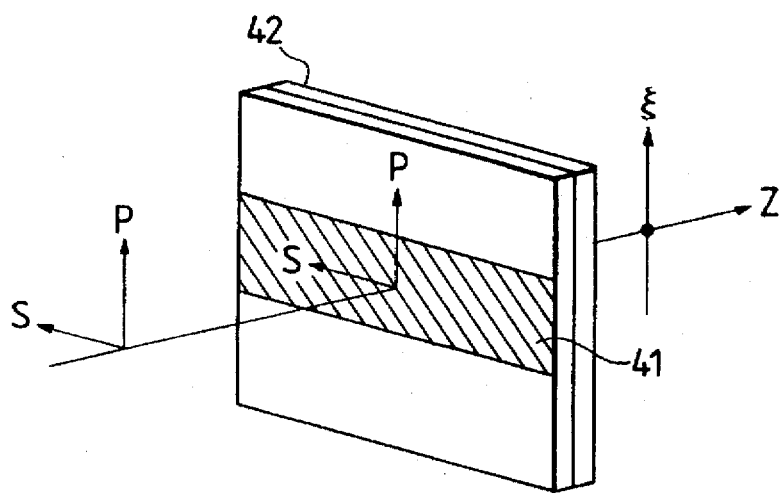
FIG. 13 is a schematic view of a filter showing another embodiment.

Still another embodiment of the present invention will now be described. FIG. 13 schematically shows a filter 42 in which a light intercepting portion 41 is provided by chromium deposition on the phase compensation plate 13 in the embodiment of FIG. 2 or 11. The light intercepting portion is in the form of a band and is disposed in a direction perpendicular to information tracks, i.e., the direction of the division line of the divided sensor. A light beam which is not intercepted by the light intercepting portion is directed to the divided sensor. FIGS. 14A to 14I show the polarized state of the pupil plane after the light is transmitted through the filter 42 and is intercepted by the light intercepting portion, and the wave surface in an area of $\xi-s \leq \xi \leq \xi+s$ becomes null and both of the amplitude and the phase are zero. By such a light intercepting portion, in spite of the absolute quantity of light detected being reduced, there are provided the effect that the frequency characteristic on the high frequency side is relatively improved, the effect that the noise component is reduced, the effect that the interference between signs is mitigated, the effect that the amount of edge shift is reduced, etc., and the accuracy of the detection of the central position of the mark is improved and a reproduction signal of good quality is obtained.

That is, the peak of the quantity of light (amplitude) of the P-polarized component of the reference wave is in the area $\xi-s \leq \xi \leq \xi+s$ near the optical axis in FIGS. 8A to 8I wherein the quantity of light (amplitude) of the S-polarized component which is a signal component is small, but the light provided by them being combined together is minute in the component modulated by the direction of domains, as shown in FIGS. 8A to 8I and therefore deteriorates the degree of modulation and increases the noise component. In contrast, by them being cut, as shown in FIGS. 14A to 14G, it becomes possible to improve the quality of the signal. Of course, the location of the light intercepting portion is not restricted to the present embodiment, but may be, for example, within the convergent light by the sensor lens in FIG. 11.

While the above embodiments of the present invention have been described with respect to an apparatus in which the reflected light from an information recording surface is received to thereby effect the reproduction of information, the present invention can also be applied to an apparatus in which the light transmitted through the information recording surface is received to thereby effect the reproduction of information, whereby similar effects can be obtained.

As described above, in the present invention, the reflected light of the minute spot from the row of information marks recorded by the mark position recording system is directed to the photodetector divided in the direction of arrangement of the row of marks and a spatial difference signal is obtained to thereby obtain a signal which zero-crosses at the central position of the information marks and good information reproduction is provided by a simple processing circuit and therefore, a compact and inexpensive apparatus can be realized without high reliability being spoiled.

Also, the above embodiments of the present invention have been described with respect to the information reproduction from a medium on which information is recorded by the mark position recording system, whereas the present invention can also be applied to the information reproduction from a medium on which information is recorded by the mark length recording system.

Figure 15:
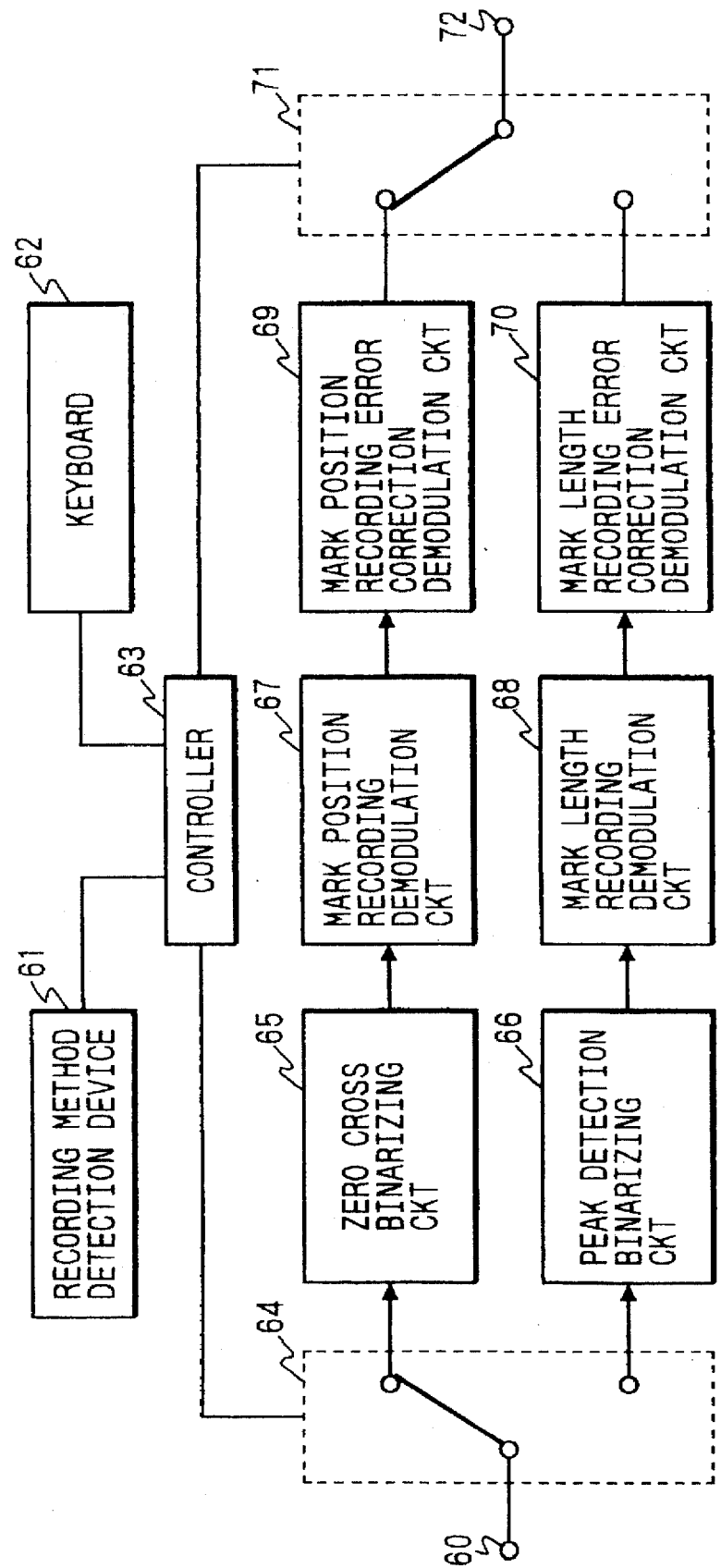
FIGS. 15 and 16 illustrate a signal processing circuit for providing the interchangeability between a recording medium of the mark position recording type and a recording medium of the mark length recording type during information reproduction.

FIG. 15 is a block diagram showing an embodiment of a signal processing circuit for providing the interchangeability between a recording medium for the mark position recording system and a recording medium for the mark length recording system during information reproduction.

In FIG. 15, reference numeral 60 designates a signal input terminal, reference numeral 61 denotes a recording method detection device for the medium, reference numeral 62 designates a keyboard, reference numeral 63 denotes a controller, reference numerals 64 and 71 designate changeover switches, reference numeral 65 denotes a zero cross binarizing circuit, reference numeral 66 designates a peak detection binarizing circuit, reference numeral 67 denotes a mark position recording demodulation circuit, reference numeral 68 designates a mark length recording demodulation circuit, reference numeral 69 denotes a mark position recording error correction demodulation circuit, reference numeral 70 designates a mark length recording error correction demodulation circuit, and reference numeral 72 denotes an output terminal.

The output of the difference detector 19 (30) of the two-divided sensor in the embodiments shown in FIGS. 2 and 11 is connected to the input terminal 60. The recording method detection device 61, as will be described later with reference to FIGS. 17 and 18, detects, for example, a depression, an aperture or a mark formed on a medium cartridge to thereby detect the recording method. That is, a recording medium optimized for respective recording methods is contained in advance in an interchangeable cartridge and the difference between the recording methods is attached as an automatically detectable mark to the cartridge. Further, in accordance with the result of the detection, a display for calling upon the operator to select and confirm the recording method is effected on a display, not shown, whereby the operator can select and confirm the recording method by means of the keyboard 62. In the case of a recording medium for the mark position recording method, the changeover switches 64 and 71 are connected to the reproduction side of the mark position recording by a control signal from the controller 63, and a difference detection signal input to the terminal 50 is binarized at the zero cross point by the binarizing circuit 65 as previously described, and a reproduction signal is output to the output terminal 72 through the demodulation circuit 67 and the error correction circuit 69. When a recording medium for the mark length recording method is selected, another signal processing route is selected by the changeover switches 64 and 71 and information recorded by the mark length recording method is reproduced.

Figure 16:
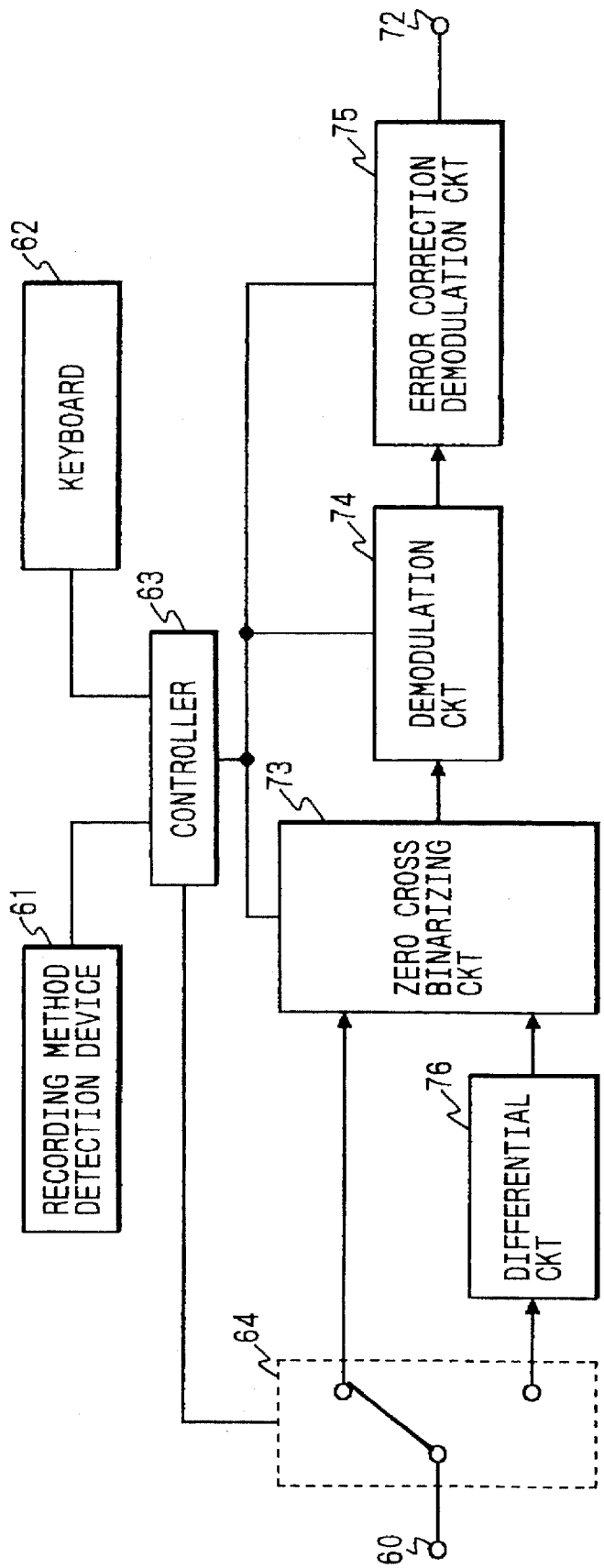

FIG. 16 is a block diagram showing another embodiment. In FIG. 16, portions similar to those in FIG. 15 are designated by similar reference numerals and need not be described. In FIG. 16, reference numeral 76 designates a differential circuit, reference numeral 73 denotes a zero cross binarizing circuit, reference numeral 74 designates a demodulation circuit, and reference numeral 75 denotes an error correction demodulation circuit. The present embodiment is an embodiment in which the same modulation-demodulation method such as mark conversion or a method having many common portions is used in both the mark position recording method and the mark length recording method and the same method is also used for error correction signs. Accordingly, in the case of the mark position recording method, the difference signal can be directly input to the zero cross binarizing circuit 73 by the changeover switch 64 and in the case of the mark length recording method, the switch 64 can be changed over and through the differential circuit 72, a signal waveform having a peak in its edge portion can be converted into a waveform which zero-crosses in its edge portion, whereafter the converted waveform can be input to the binarizing circuit 73. Thereafter, common or most portions may be subjected to common processing and therefore, a reproduction signal can be output from the terminal 72 through the demodulation circuit 74 and the error correction demodulation circuit 75. Further, design is made such that a discrimination signal between the two recording methods is supplied from the controller 63 to each circuit and the differences between the two recording methods such as a clock frequency, a format including a data length, and the way of standing or processing a flag during error correction can be corrected.

Figure 17:
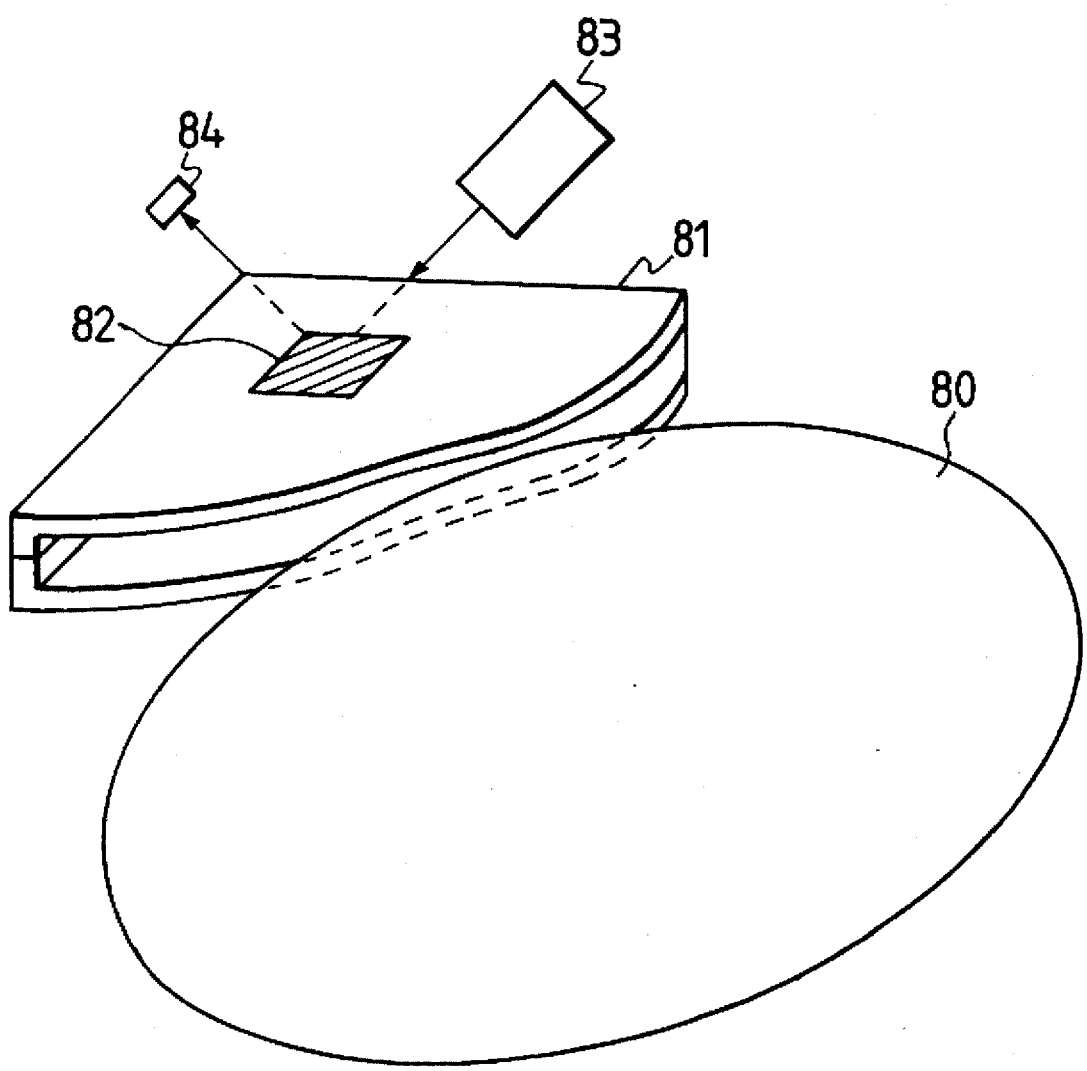
FIGS. 17 and 18 illustrate a recording system detecting device.
Figure 18:
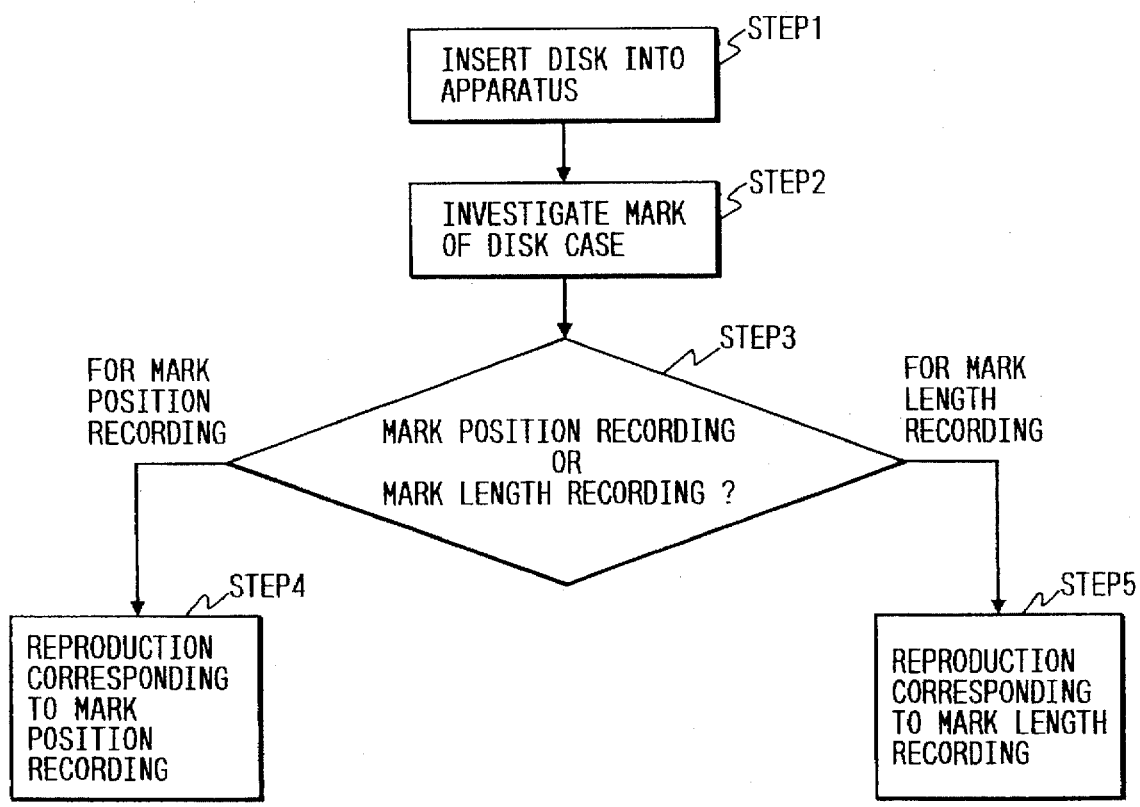

Description will now be made of an example of the recording method detection device 61. As shown in FIG. 17, a mark 82 for indicating whether the disc used is a disc for mark position recording or a disc for mark length recording is attached to the case 81 of a magneto-optical disc 80. The mark 82 is optically detectable, and for example, a mark of high reflectance is used for the disc for mark position recording and a mark of low reflectance is used for the disc for mark length recording. On the other hand, a light emitting diode 83 and an optical sensor 84 are provided on the apparatus side, and when a disc is inserted into the apparatus, light is projected from the light emitting diode 83 onto the mark 82 and the reflected light therefrom is received by the optical sensor 84. Accordingly, when the magneto-optical disc 80 is to be inserted into the apparatus, signal reproduction can be changed over and controlled in accordance with a procedure shown in FIG. 18. That is, the insertion of the magneto-optical disc into the apparatus (step 1), the investigation based on the detection signal of the optical sensor 84 for the mark 82 of the disc case 81 (step 2), the discrimination between the disc for mark position recording and the disc for mark length recording by the result of the step 2 (step 3), and the selection of reproduction corresponding to mark position recording based on the result of the discrimination (step 4) or the selection of reproduction corresponding to mark length recording (step 5) can be effected. Thus, when the magneto-optical disc is inserted into the apparatus, signal reproduction corresponding to the recording method for the disc can be automatically selected.

As described above, the present invention provides an optical information recording-reproducing apparatus in which when a minute spot is formed on an information track on the recording surface of an information recording medium and a row of information marks are recorded on the information track by the mark position recording method, for the reproduction of the information marks, reflected light from the recording surface is directed to a divided photodetector having a division line extending in a direction perpendicular to the information track and a plurality of outputs from the divided photodetector are calculation-processed, whereby the central position of the information marks can be detected to thereby suppress the amount of reproduction jitter to a minute level. Such a recording-reproducing apparatus can also be applied to the reproduction of a row of information marks recorded by the mark length recording method.

What is claimed is:

1. An optical head comprising:

applying means for applying a single spot light beam to a recording medium on which an information mark is recorded by the mark position recording method, the length of the information mark in the direction of the information track being equal to or less than the diameter of the single spot light beam;

detecting means, being divided into detecting portions by a division line extending in a direction perpendicular to an information track of the recording medium, for detecting a single light beam reflected from or transmitted through the recording medium, the single light beam being applied as a single spot light beam by said applying means;

a differential circuit for converting respective outputs from the detecting portions of said detecting means into a spatial difference signal; and a binarizing circuit for receiving the spatial difference signal from said differential circuit and for converting the difference signal to thereby detect the central position of the information mark.

2. An optical head according to claim 1, further comprising:

light intercepting means disposed in an optical path incident on said detecting means, said light intercepting means having a band-like light intercepting portion toward the direction of the division line.

3. A magneto-optical recording-reproducing apparatus comprising:

applying means for applying a magnetic field to a recording medium on which an information mark is recorded by the mark position recording method;

applying means for applying a single spot light beam to the recording medium on which the information mark is recorded by the mark position recording method, the length of the information mark in the direction of the information track being equal to or less than the diameter of the single spot light beam;

detecting means, being divided into detecting portions by a division line extending in a direction perpendicular to an information track of the recording medium, for detecting a single light beam reflected from or transmitted through the recording medium, the single light beam being applied as a single spot light beam by said applying means;

a differential circuit for converting respective outputs from the detecting portions of said detecting means into a spatial difference signal; and a binarizing circuit for receiving the spatial difference signal from said differential circuit and for converting the difference signal to thereby detect the central position of the information mark.

4. A magneto-optical recording reproducing apparatus according to claim 3, further comprising:

light intercepting means disposed in an optical path incident on said detecting means, said light intercepting means having a band-like light intercepting portion toward the direction of the division line.

5. A method of detecting a central position of an information mark recorded on a recording medium by the mark position recording method, said method comprising the steps of:

applying a single spot light beam to the recording medium such that the diameter of the single spot light beam applied on the information mark is equal to or greater than the length of the information mark in a direction of an information track of the recording medium;

detecting a single light beam reflected from or transmitted through the recording medium by detecting means divided into detecting portions by a division line extending in a direction perpendicular to the information track; and converting respective outputs from the detecting portions of the divided detecting means into a spatial difference signal by a differential circuit and converting the spatial difference signal by a binarizing circuit to thereby detect the central position of the information mark.

6. A method according to claim 5, further comprising arranging light shielding means having a light shielding portion of a band-shape along the direction of the division line, in an optical path from the recording medium to the detecting means.

7. A method of detecting a central position of an information mark recorded on a recording medium by the mark position recording method, said method comprising the steps of:

recording the information mark on the recording medium such that the length of the information mark in a direction of an information track of the recording medium does not exceed the diameter of a single spot light beam applied to the information mark;

applying the single spot light beam to the recording medium;

detecting a single light beam reflected from or transmitted through the recording medium by detecting means divided into detecting portions by a division line extending in a direction perpendicular to the information track; and converting respective outputs from the detecting portions of the divided detecting means into a spatial difference signal by a differential circuit and converting the spatial difference signal by a binarizing circuit to thereby detect the central position of the information mark.

8. A method according to claim 7, further comprising arranging light shielding means having a light shielding portion of a band-shape along a direction of the division line, in an optical path from the recording medium to the detecting means.

9. An optical head comprising:

applying means for applying a spot light beam to a recording medium on which an information mark is recorded by the mark position recording method, the length of the information mark in the direction of the information track being equal to or less than the diameter of the spot light beam;

detecting means for detecting a light beam reflected from or transmitted through the recording medium, said detecting means being divided by a division line extending in a direction perpendicular to an information track of the recording medium;

light intercepting means disposed in an optical path incident on said detecting means, said light intercepting means having a band-like light intercepting portion toward the direction of the division line;

a differential circuit for converting respective outputs of said detecting means into a spatial difference signal; and a binarizing circuit for converting the difference signal to thereby detect the central position of the information mark.

10. A magneto-optical recording-reproducing apparatus comprising:

applying means for applying a magnetic field to a recording medium on which an information mark is recorded by the mark position recording method;

applying means for applying a spot light beam to the recording medium on which the information mark is recorded by the mark position recording method, the length of the information mark in the direction of the information track being equal to or less than the diameter of the spot light beam;

detecting means for detecting a light beam reflected from or transmitted through the recording medium, said detecting means being divided by a division line extending in a direction perpendicular to an information track of the recording medium;

light intercepting means disposed in an optical path incident on said detecting means, said light intercepting means having a band-like light intercepting portion toward the direction of the division line;

a differential circuit for converting respective outputs of said detecting means into a spatial difference signal; and a binarizing circuit for converting the difference signal to thereby detect the central position of the information mark.

11. A method of detecting a central position of an information mark recorded on a recording medium by the mark position recording method, said method comprising the steps of:

applying a spot light beam to the recording medium such that the diameter of the spot light beam applied on the information mark is equal to or greater than the length of the information mark in a direction of an information track of the recording medium;

detecting a light beam reflected from or transmitted through the recording medium by detecting means divided by a division line extending in a direction perpendicular to the information track;

arranging light shielding means having a light shielding portion of a band-shape along the direction of the division line, in an optical path from the recording medium to the detecting means; and converting respective outputs from the divided detecting means into a spatial difference signal by a differential circuit and converting the spatial difference signal by a binarizing circuit to thereby detect the central position of the information mark.

12. A method of detecting a central position of an information mark recorded on a recording medium by the mark position recording method, said method comprising the steps of:

recording the information mark on the recording medium such that the length of the information mark in a direction of an information track of the recording medium does not exceed the diameter of a spot light beam applied to the information mark;

applying the spot light beam to the recording medium;

detecting a light beam reflected from or transmitted through the recording medium by detecting means divided by a division line extending in a direction perpendicular to the information track;

arranging light shielding means having a light shielding portion of a band-shape along a direction of the division line, in an optical path from the recording medium to the detecting means; and converting respective outputs from the divided detecting means into a spatial difference signal by a differential circuit and converting the spatial difference signal by a binarizing circuit to thereby detect the central position of the information mark.

* * * * *

UNITED STATES PATENT AND TRADEMARK OFFICE
CERTIFICATE OF CORRECTION

PATENT NO. : 5,701,279
DATED : December 23, 1997
INVENTOR(S) : HIROAKI HOSHI, ET AL.

It is certified that error appears in the above-identified patent and that said Letters Patent is hereby corrected as shown below:

COLUMN 4:

Line 47, "$\theta \pm k$" should read --$\pm \theta k$--.

COLUMN 6:

Line 1, "geometrically optically" should read --geometrically-optically--.

COLUMN 7:

Line 22, "operation" should read --an operation--.

COLUMN 13:

Line 63, "recording reproducing" should read --recording-reproducing--.

Signed and Sealed this

Thirtieth Day of June, 1998

Attest:

BRUCE LEHMAN

*Attesting Officer*  *Commissioner of Patents and Trademarks*